(12) United States Patent
Weber et al.

(10) Patent No.: US 11,783,731 B2
(45) Date of Patent: Oct. 10, 2023

(54) METHOD FOR MANUFACTURING A LABELING ARTICLE WITH AN ENCAPSULATED TAG END

(71) Applicant: Bedford Industries, Inc., Worthington, MN (US)

(72) Inventors: Ben Weber, Worthington, MN (US); Beau Scott, Brewster, MN (US)

(73) Assignee: Bedford Industries, Inc., Worthington, MN (US)

( * ) Notice: Subject to any disclaimer, the term of this patent is extended or adjusted under 35 U.S.C. 154(b) by 267 days.

(21) Appl. No.: 17/387,336

(22) Filed: Jul. 28, 2021

(65) Prior Publication Data
US 2021/0358339 A1 Nov. 18, 2021

Related U.S. Application Data

(62) Division of application No. 16/730,005, filed on Dec. 30, 2019, now abandoned.
(Continued)

(51) Int. Cl.
| | |
|---|---|
| *G09F 3/14* | (2006.01) |
| *B29C 48/154* | (2019.01) |
| *B29C 48/08* | (2019.01) |
| *B29C 48/00* | (2019.01) |
| *G09F 3/02* | (2006.01) |
| *B29K 21/00* | (2006.01) |

(Continued)

(52) U.S. Cl.
CPC ............ *G09F 3/14* (2013.01); *B29C 48/0011* (2019.02); *B29C 48/08* (2019.02); *B29C 48/154* (2019.02); *G09F 3/02* (2013.01); *B29K 2021/003* (2013.01); *B29L 2031/744* (2013.01); *G09F 3/04* (2013.01); *G09F 2003/0229* (2013.01); *G09F 2003/0251* (2013.01)

(58) Field of Classification Search
CPC ..... G09F 2003/0251; G09F 2003/0229; G09F 3/00; G09F 3/04; G09F 3/02; G09F 3/14; B29L 2031/744; B29K 2021/003; B29C 48/08; B29C 48/154; B65D 63/10; Y10T 156/1084
See application file for complete search history.

(56) References Cited

U.S. PATENT DOCUMENTS

| | | | | |
|---|---|---|---|---|
| 2,516,292 A | * | 7/1950 | Bennett | ................. B65D 63/10 53/399 |
| 3,455,770 A | * | 7/1969 | Dahl, Jr. | ................. H04L 17/20 156/522 |

(Continued)

*Primary Examiner* — David R Dunn
*Assistant Examiner* — Christopher E Veraa
(74) *Attorney, Agent, or Firm* — Mai D. Lauer; Westman, Champlin & Koehler P.A.

(57) ABSTRACT

A method is described for forming a plurality of articles. The method includes creasing a tag substrate between first and second ends to form a first fold, wherein a first bent portion is defined between the first end and the first fold; lifting the first bent portion away from the central span to initiate elastomer to flow under the first bent portion; disposing the elastomer on at least a portion of a central span of the tag substrate; and bonding the elastomer to the tag substrate at a first connection zone, wherein a first elastomer portion extends along a rear surface of the first bent portion and a second elastomer portion extends along a front surface of the first bent portion.

20 Claims, 10 Drawing Sheets

Related U.S. Application Data

(60) Provisional application No. 62/792,968, filed on Jan. 16, 2019.

(51) Int. Cl.
*B29L 31/00* (2006.01)
*G09F 3/04* (2006.01)

(56) References Cited

U.S. PATENT DOCUMENTS

| | | | | |
|---|---|---|---|---|
| 3,540,975 | A | * 11/1970 | Guild | B29C 48/001 |
| | | | | 160/DIG. 7 |
| 4,888,075 | A | * 12/1989 | Freedman | B32B 27/20 |
| | | | | 156/244.11 |
| 5,759,337 | A | * 6/1998 | Fujio | B29C 65/524 |
| | | | | 156/356 |
| 2009/0038751 | A1 | * 2/2009 | Hermansson | A61F 13/51464 |
| | | | | 156/269 |
| 2010/0139133 | A1 | * 6/2010 | Adams | A61B 46/10 |
| | | | | 128/849 |
| 2010/0269386 | A1 | * 10/2010 | Maltas | G09F 3/02 |
| | | | | 156/70 |
| 2016/0225292 | A1 | * 8/2016 | Maltas | G09F 3/14 |
| 2019/0240887 | A1 | * 8/2019 | Rauscher | B29C 48/21 |
| 2020/0226956 | A1 | * 7/2020 | Weber | G09F 3/14 |

* cited by examiner

METHOD FOR MANUFACTURING A LABELING ARTICLE WITH AN ENCAPSULATED TAG END

CROSS REFERENCE TO RELATED APPLICATION

This application is a division of U.S. patent application Ser. No. 16/730,005, filed Dec. 30, 2019, which claims the benefit of priority from U.S. Provisional Patent Application No. 62/792,968, filed Jan. 16, 2019. These priority applications are hereby incorporated by reference in their entirety.

BACKGROUND

The prior art is replete with merchandise labeling using bands about merchandise. Sometimes the heretofore known bands have elastic sections united to non-elastic sections, and sometimes they are endless elastic bands commonly called rubber bands.

For example, U.S. Pat. No. 2,516,292 (Bennett) of Jul. 25, 1950 teaches a preformed labeling article of elastic and non-elastic sections for holding bananas constantly under tension as they shrink. The ends of the elastic and non-elastic sections of the band are overlapped and adhesively or otherwise bonded together. U.S. Pat. No. 5,733,652 (Stowman et al.) of Mar. 31, 1998 discusses banding of merchandise by a technique involving in situ bonding of the ends of a strip of elastic material with or without an interposed separate strip of material that is not necessarily elastic. In situ bonding, however, involves carrying bonding equipment to the site where banding of merchandise is to be done (e.g., for bonds formed by heat sealing) or involves removing and disposing of a release liner at the site of banding (e.g., for bonds formed by using liner-protected contact or pressure-sensitive adhesive layers). Neither approach is ideal for field application of labels. Also, when either a preformed band of bonded sections or an in situ formed band of bonded sections is stretched about merchandise, it exerts a compressive force on the merchandise. Relatively strong bonds are needed to prevent bond separation under such circumstances, since the bonds are in the line of stretching and are subjected to the tension of stretching during use. A still further problem is the questionable reliability of machine-readable codes on stretched bands encircling merchandise, such as UPC bar codes, for example.

Where endless bands of rubber (commonly called rubber bands) are used, as in teachings of U.S. Pat. No. 5,617,656 (Ludlow et al.); U.S. Pat. No. 5,697,177 (Ludlow et al.); and U.S. Pat. No. 6,058,639 (Tinklenberg), a second step arises for attaching a tag. The two-step approach is not the most efficient, although it has been one of the more popular approaches in the past because the tag is distinct from the rubber band and can carry reliable UPC bar coding that is easy to handle at checkout scanning.

A known merchandise marking article capable of single-step application to achieve simultaneous banding and scan-reliable bar-coding of merchandise is described in U.S. Pat. No. 5,778,583 (Larsen) of Jul. 14, 1998, where the tag is attached to the rubber band by encircling a section of the tag about the rubber band prior to the time the rubber band is fastened in banding condition about merchandise. However, economy is not a hallmark for the manufacture of this prior art article.

In short, a one-step process using an economical unitary product for reliable and simultaneous tagging and banding of merchandise, including for tagging and banding clumps of agricultural produce, is much desired.

SUMMARY

In one aspect, an article includes a tag and an elastic mechanism. The tag includes a front surface, a rear surface, first and second ends, a first fold defining a first bent portion that extends from the first end to the first fold, and a central span. The rear surface of the first bent portion is configured to face the rear surface of the central span. The elastic mechanism is secured to the first bent portion, wherein a first connection zone between the elastic mechanism and the first bent portion includes a first elastomer portion that extends along the rear surface of the first bent portion, extends around the first end, and includes a second elastomer portion that extends along the front surface of the first bent portion.

In another aspect, an article strip includes a plurality of tags and a plurality of elastic mechanisms. Adjacent tags are separated by a weakened demarcation. At least one of the elastic mechanisms is associated with the at least one of the plurality of tags.

In yet another aspect, a method of forming a plurality of articles is described. The method includes creasing a tag substrate between first and second ends to form a first fold, wherein a first bent portion is defined between the first end and the first fold. The method includes disposing an elastomer on at least a portion of a central span of the tag substrate. The method includes bonding the elastomer to the tag substrate at a first connection zone, wherein a first elastomer portion extends along a rear surface of the first bent portion, extends around the first end, and a second elastomer portion extends along a front surface of the first bent portion.

This disclosure, in its various combinations, may also be characterized by the following listing of items:
1. An article including:
   a tag including:
      a front surface;
      a rear surface;
      first and second ends;
      a first fold defining a first bent portion that extends from the first end to the first fold; and
      a central span;
      wherein the rear surface of the first bent portion is configured to face the rear surface of the central span; and
   an elastic mechanism secured to the first bent portion, wherein a first connection zone between the elastic mechanism and the first bent portion includes a first elastomer portion that extends along the rear surface of the first bent portion, extends around the first end, and includes a second elastomer portion that extends along the front surface of the first bent portion.
2. The article of item 1 including a release agent disposed on at least a part of the rear surface of the central span of the tag.
3. The article of any one of items 1 or 2, wherein the first elastomer portion is larger than the second elastomer portion.
4. The article of any one of items 1-3, including:
   a second fold on the tag defining a second bent portion that extends from the second end to the second fold;
   wherein the central span is defined between the first and second folds;
   wherein the elastic mechanism secured to the second bent portion; and wherein the rear surface of the second bent portion is configured to face the rear surface of the central span.

5. The article of item 4, wherein a second connection zone between the elastic mechanism and the second bent portion includes a third elastomer portion that extends along the rear surface of the second bent portion, extends around the second end, and includes a fourth elastomer portion that extends along the front surface of the second bent portion.

6. The article of item 5, wherein the elastic mechanism has a reduced width between the first and second connection zones.

7. An article strip including:
   a plurality of tags, wherein adjacent tags are separated by a weakened demarcation, at least one of the plurality of tags including:
      a front surface;
      a rear surface;
      first and second ends;
      a first fold defining a first bent portion that extends from the first end to the first fold; and
      a central span;
      wherein the rear surface of the first bent portion is configured to face the rear surface of the central span; and
   a plurality of elastic mechanisms, wherein at least one of the elastic mechanisms is associated with the at least one of the plurality of tags, and wherein the at least one of the plurality of elastic mechanisms is secured to the first bent portion, wherein a first connection zone between the elastic mechanism and the first bent portion includes a first elastomer portion that extends along the rear surface of the first bent portion, extends around the first end, and includes a second elastomer portion that extends along the front surface of the first bent portion.

8. The article strip of item 7, including:
   a second fold on the at least one of the plurality of tags defining a second bent portion that extends from the second end to the second fold;
   wherein the central span is defined between the first and second folds;
   wherein at least one of the plurality of elastic mechanisms is secured to the second bent portion; and
   wherein the rear surface of the second bent portion is configured to face the rear surface of the central span.

9. The article strip of item 8, wherein a second connection zone between the at least one of the plurality of elastic mechanisms and the second bent portion includes a third elastomer portion that extends along the rear surface of the second bent portion, extends around the second end, and includes a fourth elastomer portion that extends along the front surface of the second bent portion.

10. The article strip of any one of items 7-9, further including a release agent disposed on at least a part of the rear surface of the central span of the at least one of the plurality of tags.

11. The article strip of any one of items 7-10, wherein the first elastomer portion is larger than the second elastomer portion.

12. The article strip of any one of items 7-11 provided in a roll configuration.

13. The article strip of any one of items 7-12 wherein the demarcation includes a plurality of perforations.

14. A method of forming a plurality of articles, the method including:

creasing a tag substrate between first and second ends to form a first fold, wherein a first bent portion is defined between the first end and the first fold;
disposing an elastomer on at least a portion of a central span of the tag substrate; and
bonding the elastomer to the tag substrate at a first connection zone, wherein a first elastomer portion extends along a rear surface of the first bent portion, extends around the first end, and a second elastomer portion extends along a front surface of the first bent portion.

15. The method of item 14 wherein disposing the elastomer includes extruding molten elastomer material onto the tag substrate.

16. The method of any one of items 14 or 15 including advancing the tag substrate and elastomer through a nip between two rollers.

17. The method of any one of items 14-16 including lifting the first bent portion away from the central span to initiate the elastomer to flow under the first bent portion.

18. The method of any one of items 14-17 including disposing a release agent on at least a part of the central span of the tag substrate.

19. The method of any one of items 14-18 including removing at least a portion of the elastomer to form an elastic securing mechanism having a reduced width over the central span of the tag substrate.

20. The method of any one of items 14-19 including:
   creasing the tag substrate between the first fold and second end to form a second fold, wherein a second bent portion is defined between the second end and the second fold; and
   bonding the elastomer to the tag substrate at a second connection zone, wherein a third elastomer portion extends along a rear surface of the second bent portion, extends around the second end, and a fourth elastomer portion extends along a front surface of the second bent portion.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. It is contemplated that all descriptions are applicable to like and analogous structures throughout the several embodiments.

While the above-identified figures set forth several embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art that fall within the scope of the principles of this disclosure.

The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used only for ease of understanding the description. It is contemplated that structures may be oriented otherwise.

Like reference numbers are used for analogous structures. For example, unless otherwise stated, reference to labeling band 25 also refers to labeling bands 25A, 25B and 25C, etc.

DETAILED DESCRIPTION

Figure 1:
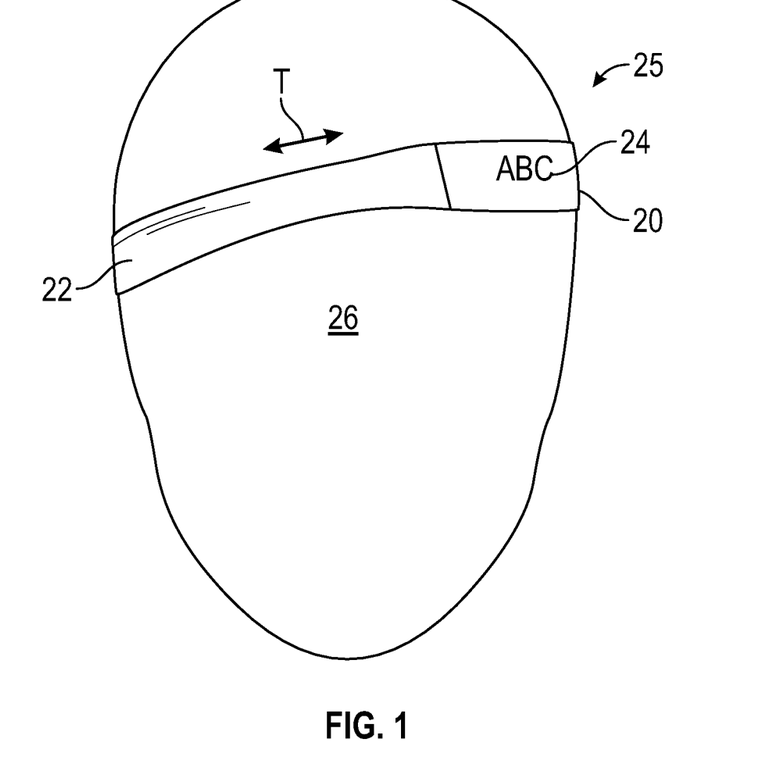
FIG. 1 is a perspective view of an exemplary labeling band attached about an article such as a watermelon.
Figure 2:
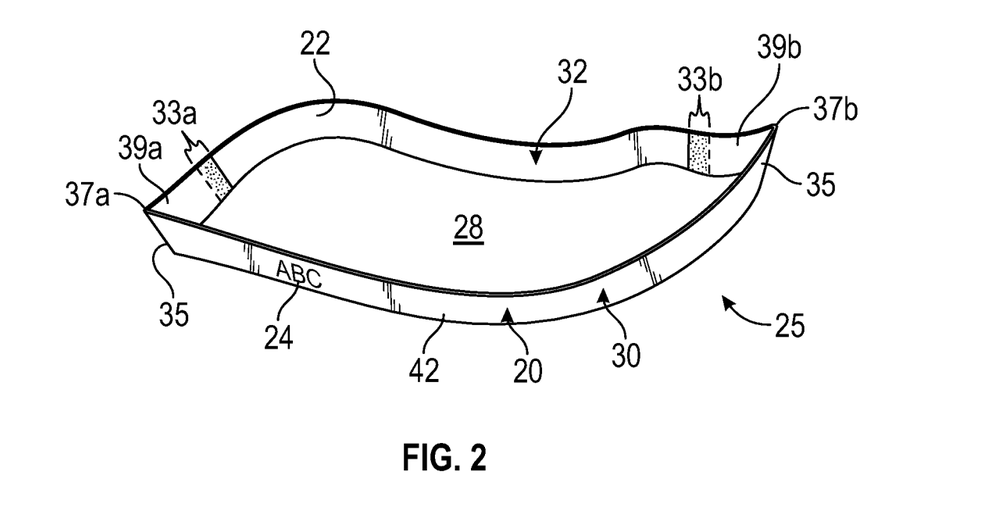
FIG. 2 is a perspective view of the labeling band of claim 1, removed from the article.

This disclosure relates to structures of labeling bands 25 and methods for their formation and use. As shown in FIGS. 1 and 2, labeling band 25 includes tag 20 and elastic securing mechanism 22. Especially in those instances where the article 26 being tagged has an irregular shape, or if it is desired to bind several articles together, the elastic securing mechanism 22 should be resilient enough hold tag 20 to the article 26 (around an article or a portion thereof, e.g., a watermelon, bunch of asparagus, large container or other item) while allowing tag 20 to maintain its labeling function without distortion to the tag 20. In many cases, the tag 20 displays indicia 24, which may include not only human detectable indicia, but also machine detectable indicia (e.g., a UPC bar code). Provision of indicia 24, such as by printing, embossing, inlaying, or engraving, for example, can be accomplished before or after tag 20 and elastic securing mechanism 22 are assembled together.

In exemplary embodiments, labeling band 25 is strong enough to stand the rigors of transport and handling, and retain itself in position on the article 26 without damage thereto. The labeling band 25 essentially includes a tag 20 connected to elastic securing mechanism 22 (e.g., a strip of elastomer material). In an exemplary embodiment, each end of the tag 20 is connected to an end of the elastic securing mechanism 22. Elastic securing mechanism 22 is bonded to tag 20 at their mutual connection zones 33 using any suitable bonding technique, such as heat sealing, adhesive application, and the like. By "bonded," it is meant that the elastic securing mechanism 22 and tag 20 are cohered together so that they are integrated as parts of a single unit (e.g., labeling band 25) and do not mutually separate in use. An exemplary use application is illustrated in FIG. 1. Elastic securing mechanism 22 and tag 20 remain connected to each other despite tension forces T placed on labeling band 25 by the stretching of elastic securing mechanism 22 to place and retain labeling band 25 on article 26. In some of the drawing figures, the bond area of connection zone 33 between ends of the tag 20 and securing mechanism 22 is indicated by stippling.

To apply the labeling band 25 to article 26, the elastic securing mechanism 22 is illustratively pulled away from the tag 20 to form a space 28 therebetween, as labeled in FIG. 2. The fruit or other article(s) 26 is then inserted into the opening 28 formed between the securing mechanism 22 and a central span 42 of the tag 20. In most cases, elastic securing mechanism 22 is stretched to insert a portion of article 26 into space 28. The securing mechanism 22 is then released. When the labeling band 25 is secured to the article 26, the distance from one end of the securing mechanism 22 to the other is longer than it is when the labeling band 25 is sitting loosely, for example, as shown in FIG. 2. In other words, the elastic securing mechanism 22 extends (i.e., stretches) to accommodate the article 26, and then, after release, remains extended to some extent while engaged about the article 26. The securing mechanism 22 is constructed of a material that is biased toward the non-extended position (e.g., an elastic material).

It is contemplated that the labeling band 25 is most useful when applied to an item that is larger in circumference than the circumference of the opening 28 formed between the tag 20 and the securing mechanism 22 in its relaxed state. Those skilled in the art will appreciate that labeling band assemblies such as those described here can be constructed to accommodate articles and items of any size and shape. In other words, the effective circumference of the opening 28 formed by the tag 20 and the securing mechanism 22 can be selectively constructed to accommodate articles 26 of different sizes.

Suitable applications for the labeling bands described herein include, but certainly are not limited to, the wrapping and labeling of produce (e.g., watermelon, cantaloupe, etc.) and the wrapping and labeling of clamshell containers (such as take-home boxes from restaurants or other such containers that are hinged on one side). Smaller versions (i.e., with smaller band opening 28) can apply to smaller items (such as asparagus, for example).

In descriptions of labeling band 25, this disclosure will sometimes refer to a "front" surface 30 of labeling band 25 and a "rear" surface 32 of labeling band 25. Such terms are used for purposes of describing the structure with reference to the drawings. However, it is understood that either surface 30, 32 of the labeling band 25 may face outward toward a viewer when applied to article 26, and either or both surfaces 30, 32 of the labeling band 25 can carry visual or otherwise detectable indicia 24. Moreover, indicia 24 may be provided on either or both of tag 20 and elastic securing mechanism 22.

Figure 3:
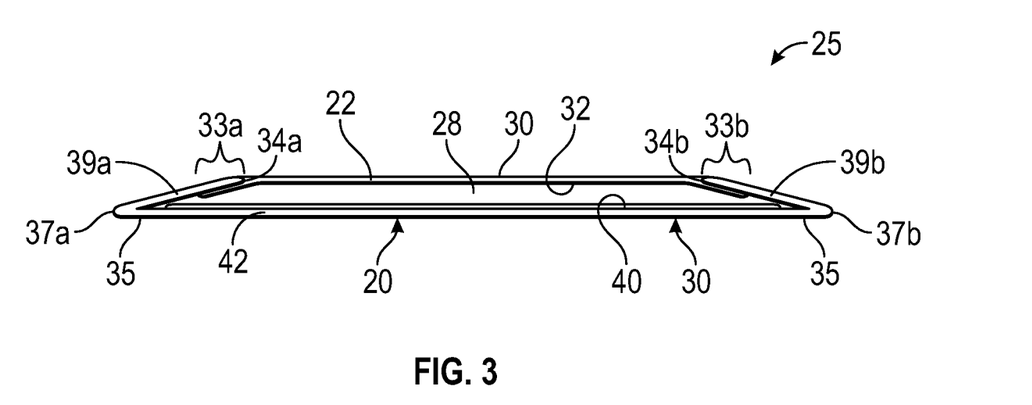
FIG. 3 is a side elevation view of the labeling band of FIGS. 1 and 2.
Figure 4:
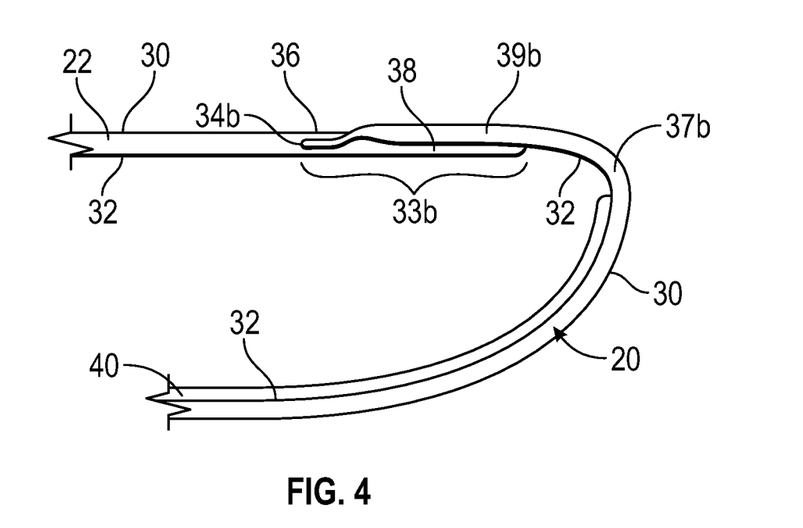
FIG. 4 is a partial side elevation view of a right portion of the labeling band of FIG. 3 in a more open configuration.

As shown in FIGS. 2-4, tag 20 and flexible attachment mechanism 22 overlap at connection zone 33. A fold 37 is formed near each outer end edge 35 of the central span 42 of the tag 20. Each end of the securing mechanism 22 is overlapped and affixed to the respective end of the tag 20 on a shorter, folded over or bent portion 39 of the tag 20. In exemplary embodiments, tag 20 and elastic attachment mechanism 22 and are made of materials that readily bond to each other. The tag and the elastic material are selected for compatible bonding, and/or a suitable adhesive is used to bond them together.

Tag 20 may bear indicia 24 such as printed product or brand information regarding the article 26 upon which it is to be mounted. Likewise, information may also be disposed on the elastic securing mechanism 22 (although in use, the securing mechanism will be stretched, and presentation of such information thereon affected). Visible surfaces 30, 32 of tag 20 and flexible attachment mechanism 22 may be treated to accept printing thereon or to enhance the visibility of information disposed thereon (e.g., such as by applying a coating thereto).

As shown in FIGS. 3 and 4, in an exemplary embodiment of labeling band 25, the elastomer material of elastic securing mechanism 22 encapsulates each end 34 of tag 20. In an exemplary embodiment, a portion 36 of elastic securing mechanism 22 extends over a part of front surface 30 of tag 20 near end 34. Moreover, another portion 38 of elastic securing mechanism 22 extends over a part of rear surface 32 of tag 20 near end 34. In the illustrated embodiment, portion 36 is much smaller than portion 38 in the extent of its coverage over tag 20. However, it is contemplated that other relative dimensions of the portion 36, 38 encapsulating end 34 of tag 20 can be used. Moreover, if desired, labeling band 25 can be turned "inside out" so that surface 30 is placed against an article 26 and surface 32 faces outward toward a viewer. Encapsulation of end 34 of tag 20 at connection zone 33 between two portions 36, 38 of elastic securing mechanism 22 greatly enhances the strength of a bond between elastic securing mechanism 22 and tag 20, thereby preventing their mutual separation in use.

Figure 5:
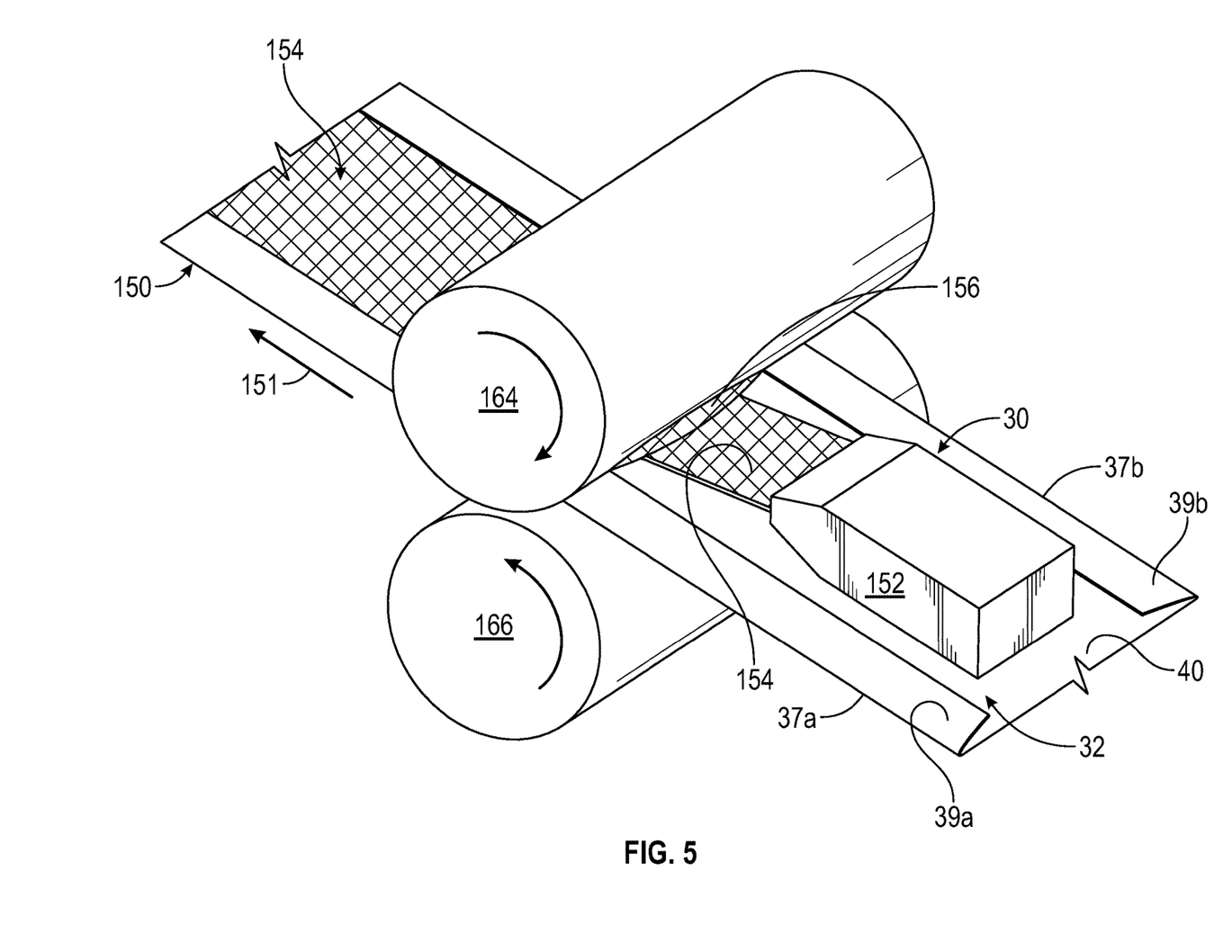
FIG. 5 is a partial perspective illustration of a system used to form an exemplary labeling band.
Figure 6:
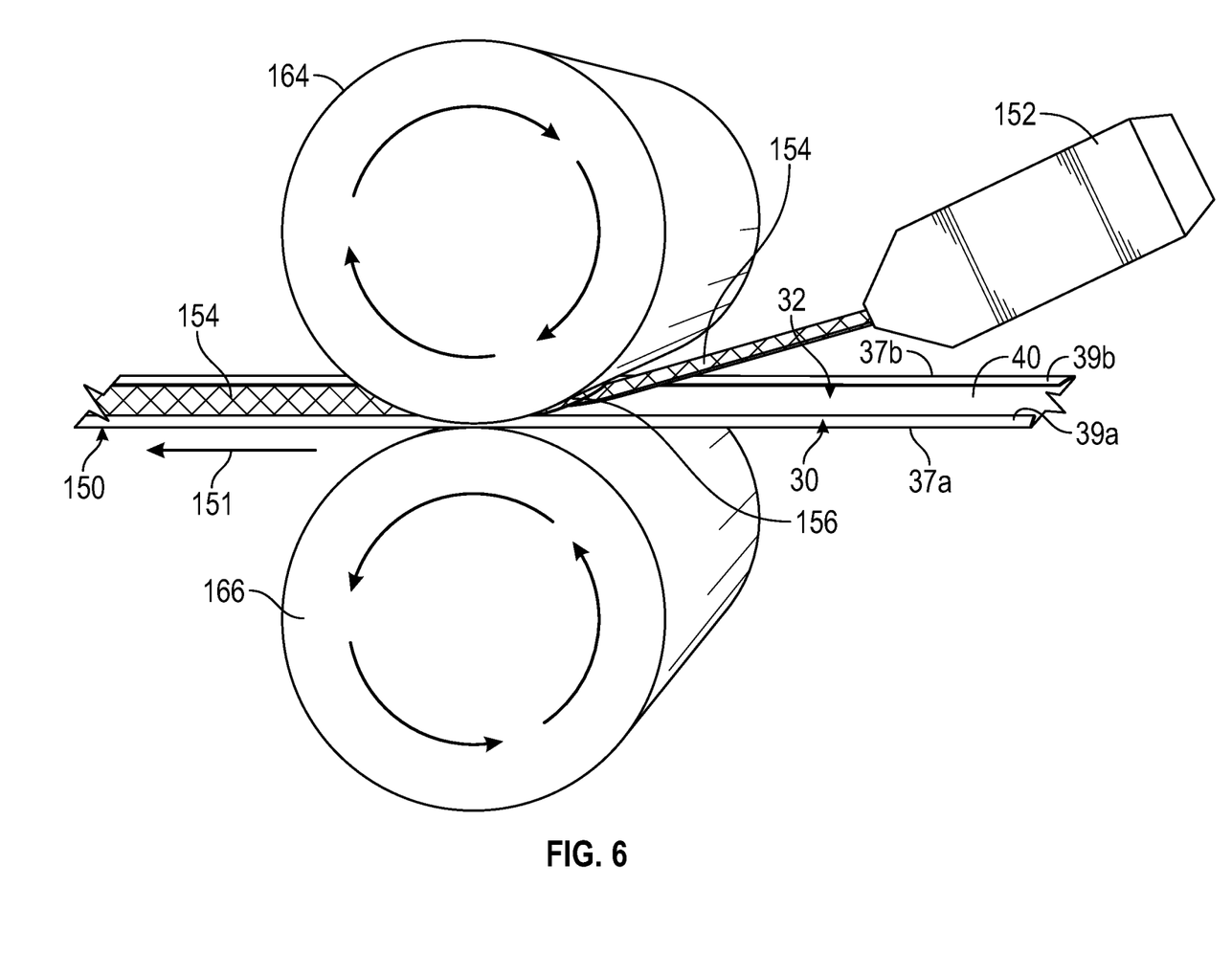
FIG. 6 is a partial elevation view of a system for manufacture of the labeling band.
Figure 7:
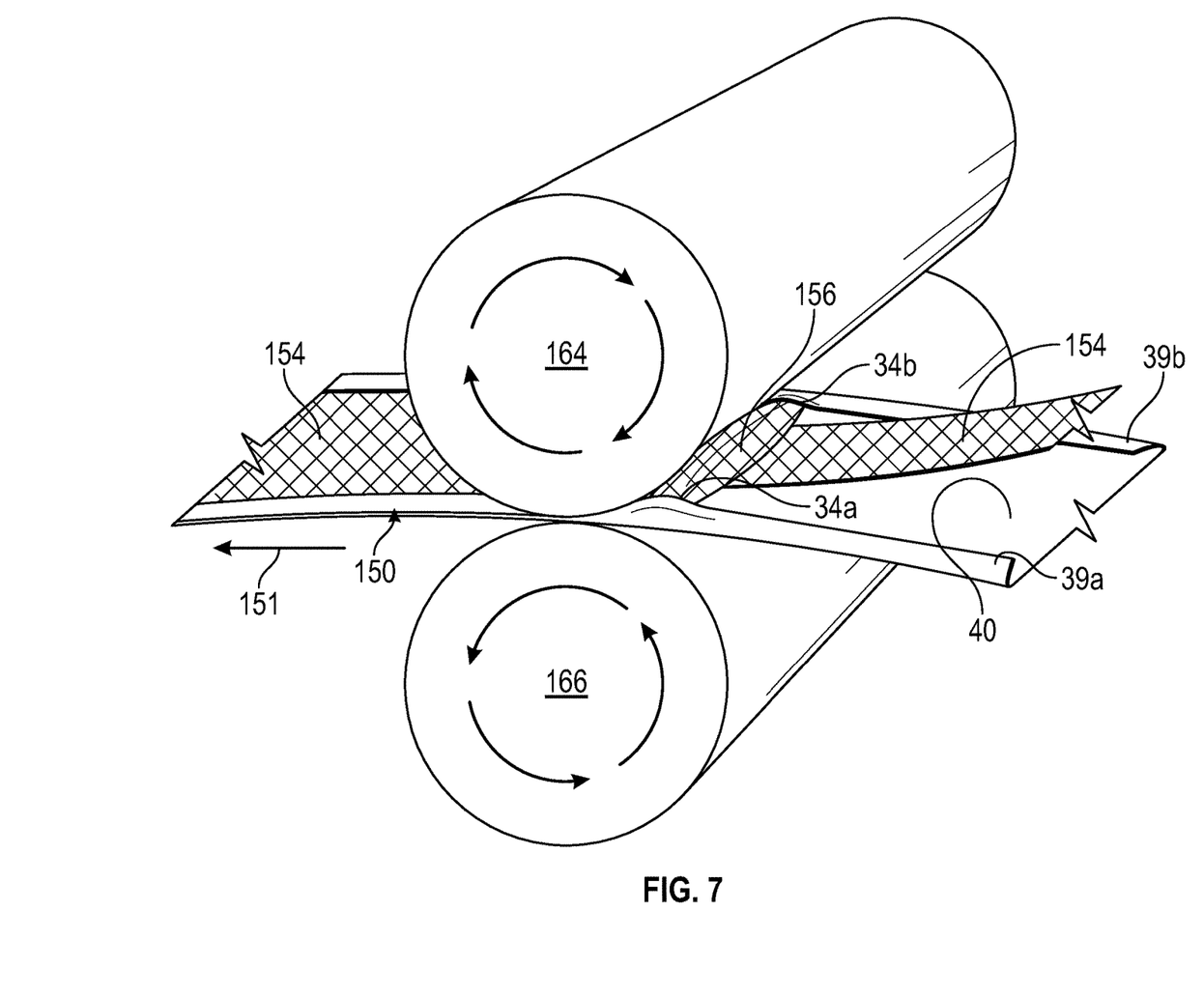
FIG. 7 is a partial perspective view showing lifting of a bent portion of a web of tag material to allow elastomer material to flow underneath the bent portion.

Web-based processing may be used for the manufacture of labeling band assemblies from a standpoint of economy, although batch processing and conveyor processing with indexing from station to station for specific operations can be useful (especially for uniquely designed or shaped tags or elastic layers). As shown in FIGS. 5-7, in web-based processing, the web of tag material 150 (which may be polystyrene) is optionally given a surface treatment such as a corona surface treatment to enhance printing ink adhesion. The web 150 can be repetitively printed with informational matter as intended for indicia 24 on each labeling band 25 to be later formed from web 150. FIGS. 5-7 illustrates one form of an application of an elastomer 154 to the tag material web 150, such as by using an extrusion die 152, lamination roller 164 and backup roller 166. The rollers not only form a layer of the elastomer 154 on top of the tag material web 150, but also bond the two materials together by nip pressure between the lamination roller 164 and a backup roller 166 supporting the tag material web 150.

The printed tag material web 150 is fed simultaneously with molten elastomer 154 (e.g., a thermoplastic elastomer such as styrenic block copolymer) through the nip of rollers 164, 166. The molten elastomer 154 is applied to extend as a layer over the web 150 as it is advanced. The temperatures of the rollers 164, 166 (from about 40° F. to about 200° F.) are selected to cool the molten elastomer 154 to a substantially solid state while simultaneously applying pressure (up to 500 pounds per square inch) to effect the formation of a layer of elastomer 154 at the thickness desired (e.g., 16 mil) for elastic securing mechanism 22 and also to effect formation of bonds between the elastomer 154 and the tag material 150 (such as the connection zones 33 between elastic securing mechanism 22 and tag 20 illustrated in FIGS. 2-4).

As shown in FIGS. 3 and 4, in an exemplary embodiment, a release agent 40 is disposed upon a portion of the rear surface 32 of the tag 20 in order to inhibit bonding of at least a portion of the elastic securing mechanism 22 with the tag 20, such as, for example, during a molten elastomer extrusion process as described above. Release agent 40 facilitates separation of elastic securing mechanism 22 from tag 20 to form space 28 for the acceptance of a portion of article 26. In an exemplary embodiment, the release agent 40 is applied to essentially all of tag portion rear surface 32 on central span 42 between folds 37, but not to bent portions 39. Thus, the securing mechanism 22 bonds to the folded over end portions 39 of the tag 20, but not to the central span of tag 20 between folds 37. An exemplary release agent 40 includes silicone or another slippery surface coating applied to tag material web 150, such as during or after printing, for example. In one embodiment, the release agent 40 is a separate structural layer of material disposed between the tag substrate 150 and the molten elastomer 154. The tag material for tag 20 and the elastomer material for elastic securing mechanism 22 thus only adhere to each other in the connection zones 33. Tag material web 150 having bent portions 39 is fed below elastomer extruder 152 and on bottom roller 166 to accept receipt of a flow of molten elastomer material for layer 154 thereon. Together, the layer of molten elastomer 154 and the web of tag material 152 travel in process direction 151 between rollers 164 and 166.

As shown in FIG. 7, to initiate a flow of molten elastomer 154 under bent portions 39, the bent portions 39 can be lifted near rollers 164, 166 to permit the elastomer 154 to flow thereunder. Such lifting may be performed manually by an operator or automatically with a tool, for example. The lifting of both bent portions 39 allows the molten elastomer 154 to flow under the bent portions 39 and toward folds 37. Once the flow of molten elastomer has been established under the bent portions 39, the bent portions 39 no longer need to be held in a raised configuration.

As the layer 154 of molten elastomer and web 150 of tag material pass through the nip of rollers 164, 166, a volume of the elastomer material squeezed from between the nip of rollers 164, 166 forms a bead 156 of molten elastomer that pools on release agent 40 disposed on rear surface 32 of web 150, on central span 42 of tag material. The bead 156 forces excess elastomer material under bent portions 39 to form portion 38 of elastic securing mechanism 22. Moreover, because of the excess volume of molten elastomer at bead 156, some of the elastomer material flows over end 34 of the bent portion 39 of tag material and forms portion 36 of elastic securing mechanism 22 around end 34. In this manner, the bead 156 of molten elastomer encapsulates the end 34 of tag 20 in elastic securing mechanism 22. A relatively narrow die face for elastomer exiting extruder 152 concentrates most of the elastomer on central span 42 of web 150 of tag material between the bent portions 39. As shown in FIGS. 3 and 4, because release agent 40 is applied only between folds 37, elastomer disposed under bent portion 39 can bond thereto to form portion 38 of elastic securing mechanism 22 on tag 20.

Figure 8:
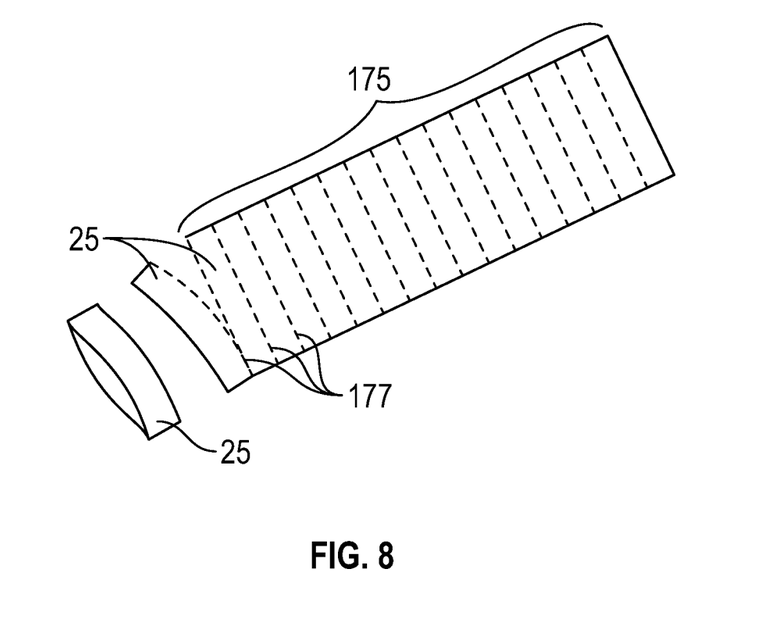
FIG. 8 is a perspective view of a strip of ruptureably connected labeling bands after bonding of the tag and elastic securing mechanism.
Figure 9:
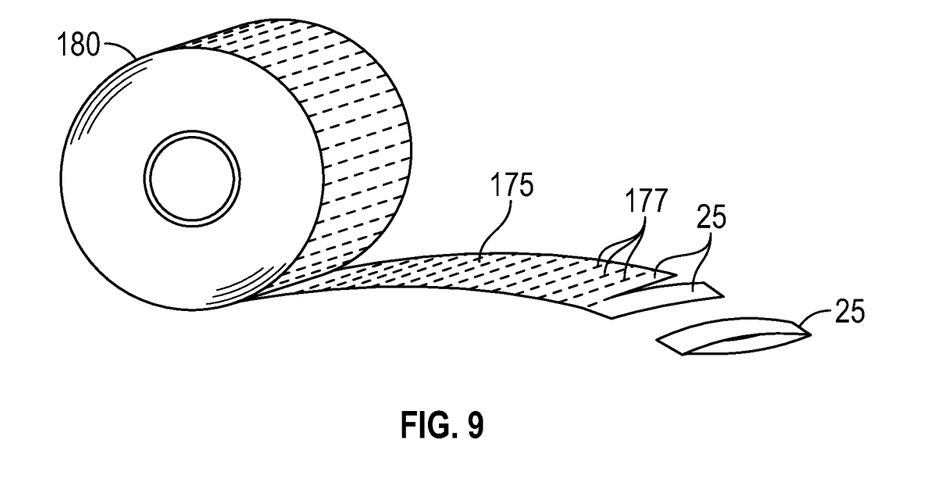
FIG. 9 is a perspective view of a roll formed of the strip of FIG. 8.

As shown in FIGS. 8 and 9, after the elastomer 154 has been bonded to the tag portion substrate 150, this bonded strip 175 is then further processed to define individual labeling band assemblies 25. A cut may be made to separate each labeling band 25 from the bonded strip 175. Individual labeling bands 25 may be severed from the bonded together web assembly strip 175 (after sufficient curing of the elastomer) and processed and packaged for distribution and use.

Additionally or alternatively, the bonded together strip 175 may include weakened separation lines 177 between adjacent ruptureably connected labeling bands 25 (both the tag substrate 150 and elastomer layer 154 are perforated). While the illustrated embodiment shows separations lines 177 formed with perforations, it is contemplated that other configurations of weakened separation lines can also be used, including for example, score lines, cut lines of full or partial depth, and other mechanisms for forming a ruptureable line or contour of weakness connecting a labeling band 25 to strip 175. Although the separation lines 177 are illustrated as linear and laterally extending across the strip 175, it is contemplated that the separation lines 177 need not be linear or laterally extending. For instance, the separation lines could be defined as curved lines or serpentine lines between adjacent labeling bands 25. In addition, labeling bands of other shapes could be formed by die cutting in desired shapes.

In FIG. 8, one discrete labeling band 25 is shown as already separated from the strip 175, and one labeling band 25 is shown in the process of being separated from the strip 175 along its respective separation line 177. Such strips 175 of labeling bands may be formed in various lengths, such as lengths bearing 3-5 bands, 10-25 bands, or even in longer lengths which may be fan-folded and stacked for distribution and use. An alternative labeling band distribution configuration is shown in FIG. 9. Here, a strip 175 is spooled into roll form 180, and then individual labeling bands 25 can be torn off of the roll 180 as desired at the separation lines 177. In FIG. 9, one discrete labeling band 25 is shown as having already been separated from the roll 180, while another labeling band 25 is shown in the process of being separated from the roll 180 via its respective separation line 177.

Figure 10:
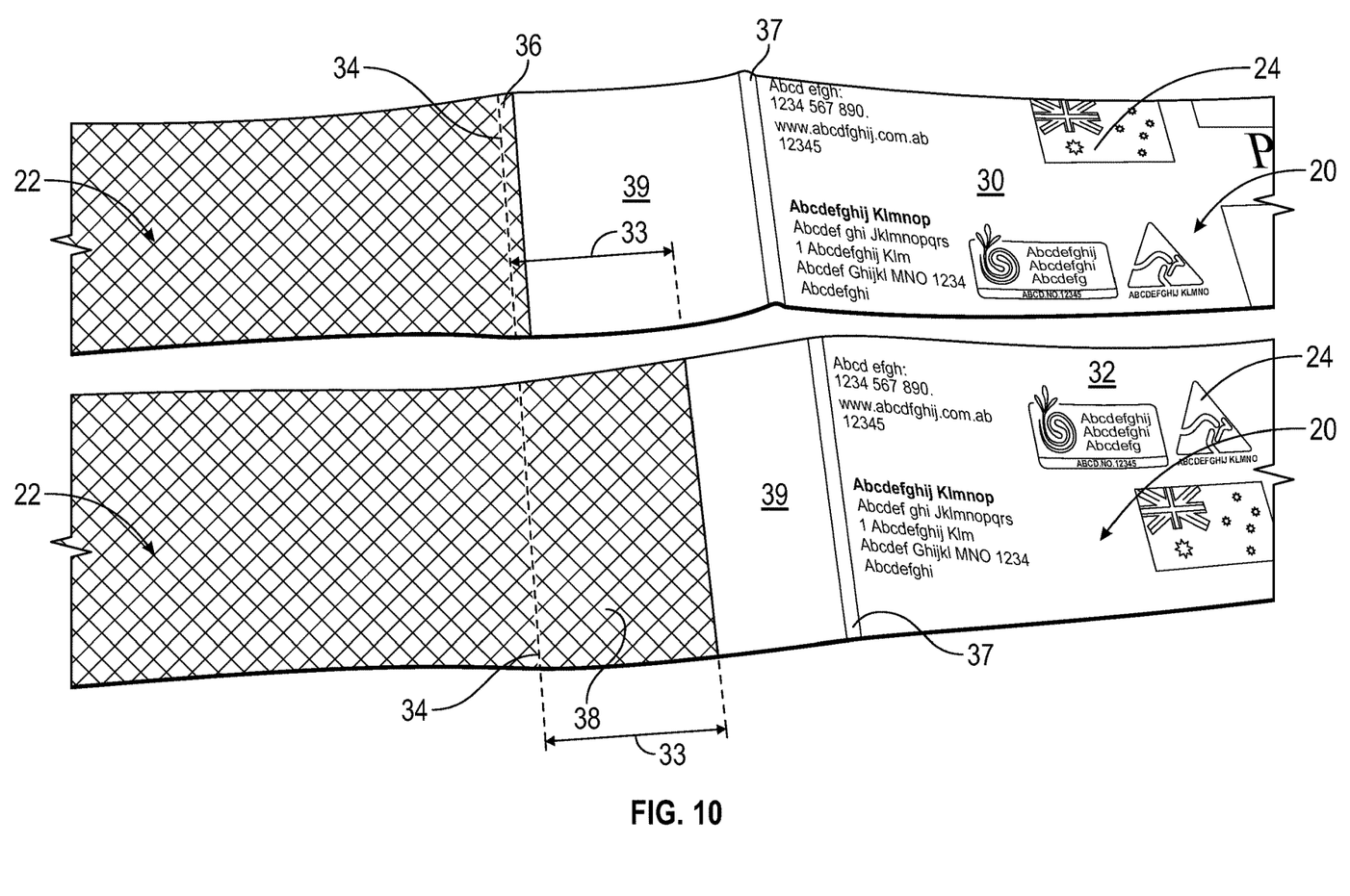
FIG. 10 is a partial plan view showing a front surface and a rear surface of exemplary labeling bands.

FIG. 10 shows partial views of front surface 30 and rear surface 32 of exemplary labeling bands 25. It can be seen that end 34 of tag 20 is encapsulated between portions 36 and 38 of elastic securing mechanism 22. Because portions 36, 38 are generally thinner than an overall thickness dimension of elastic securing mechanism 22, the disclosed structure reduces elastomer peeling from tag 20. Moreover, as shown in FIG. 10, in an embodiment where portion 36 is much smaller in surface area than portion 38 of elastic securing mechanism 22, the surface 30 of tag 20 exhibits a greater exposed surface area for the display of indicia 24, such as in a case where the indicia are provided only on tag 20 and not on elastic securing mechanism 22.

FIGS. 11-17 illustrate alternative embodiments of labeling bands formed as disclosed above. In exemplary embodiments, the elastomer layer 154 is not disposed (i.e., laminated) over the entire width of the folded web of tag material 150, but only across a central portion thereof encapsulating the ends 34 of the bent portions 39 in order to define the connection zones 33 therebetween.

Figure 11:
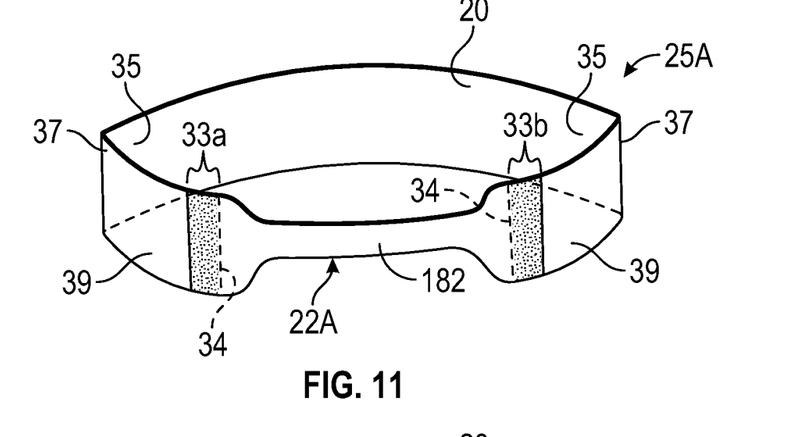
FIGS. 11, 12, 13, 14, 15, 16 and 17 are perspective views of labeling bands with alternative configurations for the elastic securing mechanism.

As shown in FIG. 11, on labeling band 25A, the elastomer layer 22A is necked down or reduced in width between opposed ends 34 of the tag 20. The elastic securing mechanism 22A has a width comparable to the width of the tag 20 at and adjacent each connection zone 33, but then has a reduced width portion 182 between the connection zones 33. This configuration may reduce the stress placed on the bond area joint (connection zone 33) between the tag material 20 and the elastomer layer 22A by directing more of the stretch in the elastomer layer 22A to its reduced width section 182. The elastomer layer 22A may be kiss cut during processing to remove portions thereof to create the reduced width section 182.

Figure 12:
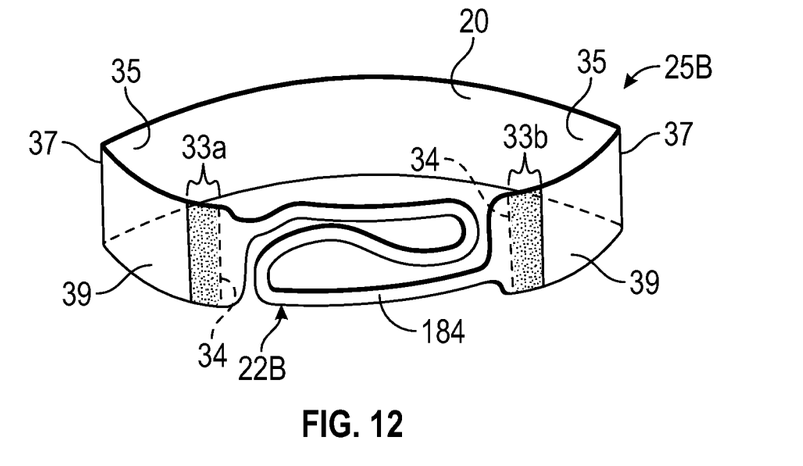

As shown in FIG. 12, on labeling band 25B, the elastomer layer 22B is necked down or reduced in width between opposed ends 34 of the tag 20. The elastic securing mechanism 22B has a width comparable to the width of the tag 20 at and adjacent each connection zone 33, but then has a reduced width portion 184 between the connection zones 33 and is also formed to define a length of elastomer between both opposed ends 34 that is longer than the distance between the opposed ends 34, produced with the portion 184 snaking back and forth. Thus, the elastomer layer 22B can stretch to even further lengths than, for example, the elastomer layer 22A of the labeling band 25A of FIG. 11. Indeed, in its unstretched state (as seen in FIG. 12), the elastomer layer has a longer length (nearly three times the length of the unstretched elastomer of the labeling band of FIG. 11). This configuration may reduce the stress placed on the bond area joint (connection zone 33) between the tag material 20 and the elastomer layer 22B by directing more of the stretch in the elastomer layer 22B to its reduced width section 184. The elastomer layer 22B may be kiss cut during processing to remove excess portions thereof and to define the "switch back" or "Z-shaped" elastomer layer 22B.

Figure 13:
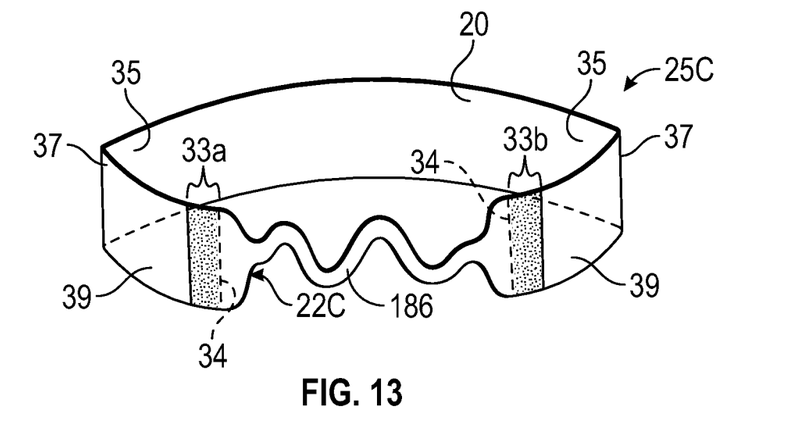

As shown in FIG. 13, on labeling band 25C, the elastomer layer 22C is necked down or reduced in width between opposed ends 34 of the tag 20. The elastic securing mechanism 22C has a width comparable to the width of the tag 20 at and adjacent each connection zone 33, but then has a reduced width portion 186 between the connection zones 33 and is also formed to define a length of elastomer between both opposed ends 34 that is longer than the distance between the opposed ends 34, produced with the portion 186 having an undulating or serpentine shape. Thus, the elastomer layer 22C can stretch to even further lengths than, for example, the elastomer layer 22A of the labeling band 25A of FIG. 11. This configuration may reduce the stress placed on the bond area joint (connection zone 33) between the tag material 20 and the elastomer layer 22C by directing more of the stretch in the elastomer layer 22C to its reduced width section 186. The elastomer layer 22C may be kiss cut during processing to remove excess portions thereof and to define the "S" or squiggle shaped elastomer layer 22C.

Figure 14:
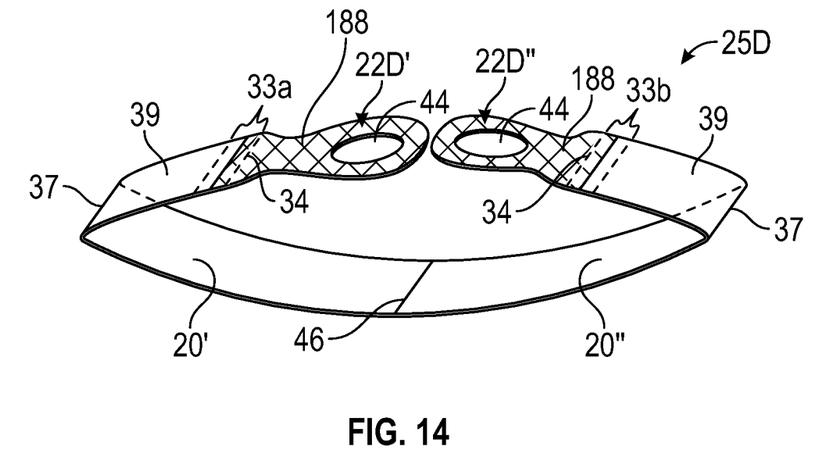
Figure 15:
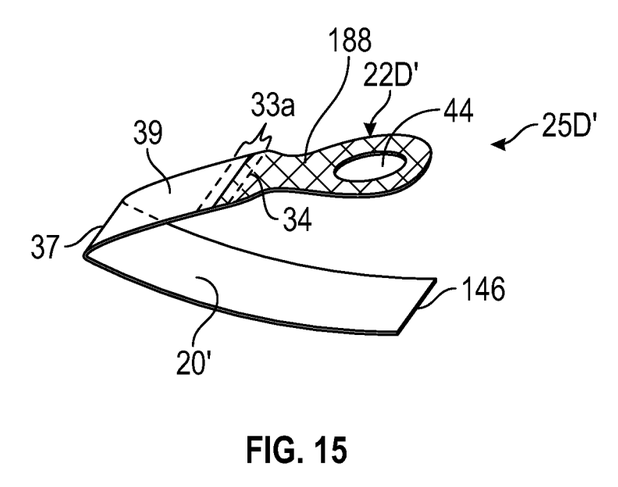

As shown in FIG. 14, on labeling band 25D, the elastomer layer 22D is separated into two sections 22D' and 22D" between opposed ends 34 of the tag 20. Each of the sections 22D' and 22D" has a loop configuration including aperture 44 therethrough. The elastic securing mechanism 22D has a width comparable to the width of the tag 20 at and adjacent each connection zone 33, but then has a reduced width portion 188 between the connection zones 33. This configuration may reduce the stress placed on the bond area joint (connection zone 33) between the tag material 20 and the elastomer layer 22D by directing more of the stretch in the elastomer layer 22D to its reduced width section 188, such as when the loop around aperture 44 is stretched to permit insertion of a product. The elastomer layer 22D may be kiss cut during processing to remove excess portions thereof and to define the double loop configurations of elastomer layer 22D. Further, tag 20 may be cut along line 46 to render two separate tag sections 20' and 20", each having a corresponding elastomer section 22D', 22D" attached thereto at respective connection zones 33a, 33b. As shown in FIG. 15, a half of the labeling band 25D can serve on its own as labeling article 25D'. The strong bond between the tag 20' and the elastomer section 22D' provides for a durable labeling article, wherein the tag 20' and the elastomer section 22D' are resistant to mutual separation during handling and use.

Figure 16:
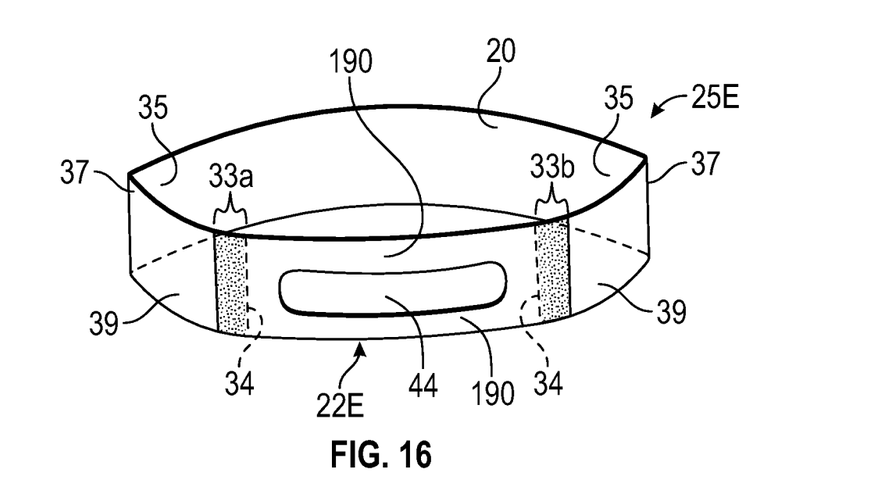

As shown in FIG. 16, on labeling band 25E, the elastomer layer 22E includes aperture 44, which facilitates increased stretching of elastomer layer 22E and/or insertion of a portion of a product. This configuration may reduce the stress placed on the bond area joint (connection zone 33) between the tag material 20 and the elastomer layer 22E by directing more of the stretch in the elastomer layer 22E to its reduced width sections 190 surrounding aperture 44. The elastomer layer 22E may be kiss cut during processing to remove material to define the aperture 44.

Figure 17:
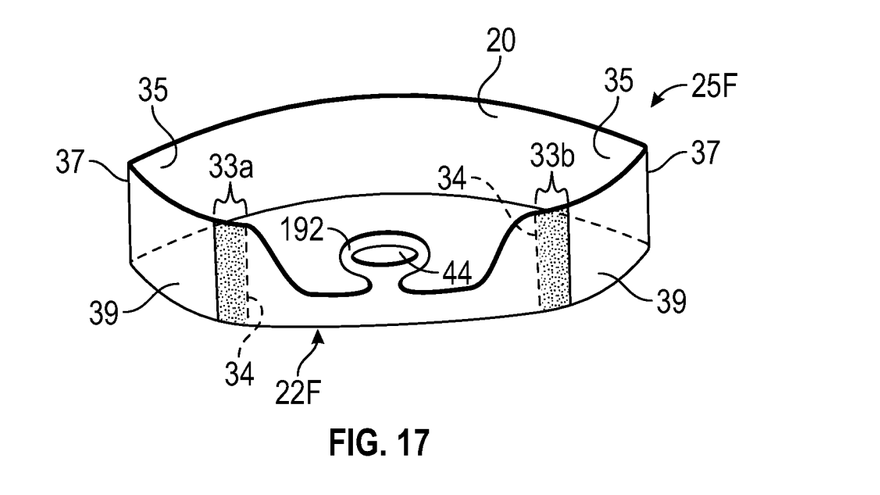

As shown in FIG. 17, on labeling band 25E, the elastomer layer 22E includes aperture 44 through loop 192. Aperture 44 may be configured for insertion of a portion of a product. Product attachment using an elastomer loop 192 is described in U.S. Pat. No. 8,438,766 to Ludlow, which is hereby incorporated by reference. The elastomer layer 22F may be kiss cut during processing to remove material to define the loop 192 and aperture 44.

While some drawings show a labeling band 25 including two ends 34 encapsulated in elastomer material of securing mechanism 22, it is also contemplated that the described teachings may also apply to a labeling tag 20 having a single connection zone 33 with an elastic mechanism 22. Moreover, the tag 20 and elastic mechanism 22 can have configurations other than those illustrated.

Many different materials can be utilized in the implementation of the labeling bands 25 described herein. Examples of such materials, not by limitation, will now be provided. In forming a labeling band 25, suitable tag material substrates include (1) 10 mil thick Artisyn™ synthetic paper, product no. UAR 100, available from Protect-All Print Media, Inc., Darrien, Wis., at a width of 8.5 inches; (2) 7.5 mil thick Teslin™ synthetic paper, 7 mil SP 700, available from Technicote, Inc., Cuyahoga Falls, Ohio (made by PPG Industries, Pittsburgh, Pa.), at a width of 8.5 inches; or (3) 4 mil thick PET Tairilin polyester film, product nos. CH284, CH885 and Cy18, available from Nan Ya Plastics Corporation USA of Wharton, Tex., at widths of 5-15 inches.

For the elastic securing mechanism 22, many elastomer materials are suitable, including thermoplastic elastomers. In one example, a suitable elastomer can be a 50/50 blend of Kraton™ D2104 and Kraton™ D2109, available from Kraton Polymers, LLC, Houston, Tex., used with 0.5% Kemamide U slip additive available from Crompton Corp. (now Chemtura Corporation, Middlebury, Conn.). This elastomer blend adheres well to the exemplary tag material substrates, and the bond between these materials exhibits good bond strength under tension. Additionally, it is possible to colorize the elastomer with appropriate additives. The process melt temperature for this elastomer blend is approximately 389° F.

There are many options for suitable release mechanisms 40 as well. These are among the release agents considered useful: (1) 7.5 inch wide ultraviolet light (UV) cured release coating atop white ink on the tag material substrate (the ink is Flint Ink RVW 20182, available from Flint Group, Ann Arbor, Mich.); (2) 7.5 inch wide silicone coated PET release, such as Technicote 2 mil L-25 (a loose release liner film silicone coated on one side); (3) 7.5 inch wide silicone coated PET release with an adhesive backing adhered to the tag material substrate; and (4) UV cured high-gloss varnish on the tag material substrate.

In addition, it is also contemplated that the tag material substrate 150 can be formed from an elastomer material. Any suitable material will work, so long as the desired bond can be achieved between the two components 20, 22 to achieve a labeling band 25 with a loop space 28, wherein at least one of the materials has elastic stretch properties. In addition, in some applications, it may be desirable to add compatible additives to the tag and/or elastic securing mechanism material, to achieve such ends as coloration, opacity, resistance to degradation on exposure to some environments (e.g., sunlight), improved impact properties and adhesion properties, luminescence, and scent impregnation, for example.

Non-limiting, exemplary embodiments of labeling articles, labeling bands, article strips, labeling band strips, and methods for forming a plurality of labeling bands are described. For example, a labeling band 25 includes a tag 20 and an elastic mechanism 22. The labeling band 25 has a front surface 30 and a rear surface 32, and the tag 20 forming part of the labeling band 25 also shares a portion of front surface 30 and a rear surface 32. Tag 20 has first and second ends 34, 34; first and second folds 37a, 37b defining first and second bent portions 39a, 39b; and a central span 42 between the first and second folds 371, 37b. The first bent portion 39a extends from the first end 34 to the first fold 37a, and the rear surface 32 of the first bent portion 39a is configured to face the rear surface 32 of the central span 42. The second bent portion 39b extends from the second end 34 to the second fold 37b, and wherein the rear surface 32 of the second bent portion 39b is configured to face the rear 32 surface of the central span 42. The elastic mechanism 22 is secured to each of the first bent portion 39a and the second bent portion 39b at first connection zone 33a and second connection zone 33b. The first connection zone 33a between the elastic mechanism 22 and the first bent portion 39a includes a first elastomer portion 38 that extends along the rear surface 32 of the first bent portion 39a, extends around the first end 34, and includes a second elastomer portion 36 that extends along the front surface 30 of the first bent portion 39a. The second connection zone 33b between the elastic mechanism 22 and the second bent portion 39b includes a third elastomer portion 38 that extends along the rear surface 32 of the second bent portion 39b, extends around the second end 34, and includes a fourth elastomer portion 36 that extends along the front surface 30 of the second bent portion 39b.

In an exemplary embodiment, the labeling band 25 includes a release agent 40 disposed on at least a part of the rear surface 32 of the central span 42 of the tag 20. In an exemplary embodiment, the first elastomer portion 38 is larger than the second elastomer portion 36. In an exemplary embodiment, the elastic mechanism 22 has a reduced width between the first and second connection zones 33a, 33b. In an exemplary embodiment such as shown in FIG. 11, a reduced width portion 182 of the elastic mechanism 22A is defined by a necked-down geometry between the first and second connection zones 33a, 33b. In an exemplary embodiment such as shown in FIG. 12, a reduced width portion 184 of the elastic mechanism 22B is defined by a switch-back geometry between the first and second connection zones 33a, 33b. In an exemplary embodiment such as shown in FIG. 13, a reduced width portion 186 of the elastic mechanism 22C is defined by a squiggle-shape geometry between the first and second connection zones 33a, 33b.

An exemplary method of forming a plurality of labeling bands 25 includes creasing a tag substrate 150 between first and second ends 34, 34 to form first and second folds 37a, 37b. A first bent portion 39a is defined between the first end 34 and the first fold 37a, a second bent portion 39b is defined between the second end 34 and the second fold 37b; and a central span 42 is defined between the first and second folds 37a, 37b. The method includes disposing an elastomer 154 on at least a portion of the central span 42. The method includes bonding the elastomer 154 to the tag substrate 150 at first and second connection zones 33a, 33b. In an exemplary method, disposing the elastomer 154 includes extruding molten elastomer material onto the tag substrate 150. In an exemplary method, the tag substrate 150 and elastomer 154 are advanced through a nip between two rollers 164, 166. An exemplary method includes lifting the first bent portion 39 away from the central span 42 to allow the elastomer 154 to flow under the first bent portion 39. An exemplary method includes disposing a release agent 40 on at least a part of the central span 42 of the tag substrate 150. An exemplary method includes removing at least a portion of the elastomer to form an elastic securing mechanism 22A, 22B, 22C having a reduced width over the central span 42 of the tag substrate 150.

Although the subject of this disclosure has been described with reference to several embodiments, workers skilled in the art will recognize that changes may be made in form and detail without departing from the scope of the disclosure. In addition, any feature disclosed with respect to one embodiment may be incorporated in another embodiment, and vice-versa.

The invention claimed is:

1. A method of forming a plurality of articles, the method including:
    creasing a tag substrate between first and second ends to form a first fold, wherein a first bent portion is defined between the first end and the first fold;
    lifting the first bent portion away from a central span of the tag substrate to initiate elastomer to flow under the first bent portion;
    disposing the elastomer on at least a portion of the central span of the tag substrate; and
    bonding the elastomer to the tag substrate at a first connection zone, wherein a first elastomer portion extends along a rear surface of the first bent portion and a second elastomer portion extends along a front surface of the first bent portion, thereby forming a bonded assembly.

2. The method of claim 1 wherein disposing the elastomer includes extruding molten elastomer material onto the tag substrate.

3. The method of claim 1 including advancing the tag substrate and elastomer through a nip between two rollers.

4. The method of claim 3 wherein disposing the elastomer comprises forming a bead of elastomer that is squeezed from between the two rollers.

5. The method of claim 1 including disposing a release agent on at least a part of the central span of the tag substrate.

6. The method of claim 1 including removing at least a portion of the elastomer to form an elastic securing mechanism having a reduced width over the central span of the tag substrate.

7. The method of claim 1 including:
    creasing the tag substrate between the first fold and second end to form a second fold, wherein a second bent portion is defined between the second end and the second fold; and
    bonding the elastomer to the tag substrate at a second connection zone, wherein a third elastomer portion extends along a rear surface of the second bent portion and a fourth elastomer portion extends along a front surface of the second bent portion.

8. The method of claim 7 wherein:
    the third elastomer portion is bonded to a first area of the rear surface of the second bent portion;
    the fourth elastomer portion is bonded to a second area of the front surface of the second bent portion; and
    the first area is greater than the second area.

9. The method of claim 8 comprising reducing a width of the elastomer between the first bent portion and the second bent portion.

10. The method of claim 8 comprising disposing an aperture in the elastomer between the first bent portion and the second bent portion.

11. The method of claim 1 wherein:
    the first elastomer portion is bonded to a first area of the rear surface of the first bent portion;
    the second elastomer portion is bonded to a second area of the front surface of the first bent portion; and
    the first area is greater than the second area.

12. The method of claim 1 comprising disposing an aperture in the elastomer.

13. The method of claim 1 comprising disposing a plurality of separation lines on the bonded assembly.

14. The method of claim 1 comprising cutting the bonded assembly into a plurality of bands.

15. The method of claim 1 comprising printing on a front surface of the tag substrate.

16. The method of claim 1 comprising printing on a rear surface of the tag substrate.

17. The method of claim 1 comprising rolling the bonded assembly.

18. The method of claim 1 comprising treating the tag substrate to enhance ink adhesion.

19. The method of claim 1 comprising cutting the bonded assembly into a plurality of strips, at least one of the plurality of strips comprising a plurality of bands.

20. The method of claim 1 comprising folding the bonded assembly.

* * * * *